United States Patent [19]
Sechrist et al.

[11] Patent Number: 5,837,636
[45] Date of Patent: Nov. 17, 1998

[54] METHOD FOR REDUCING CHLORIDE EMISSIONS FROM A CATALYST REGENERATION PROCESS

[75] Inventors: Paul A. Sechrist, Des Plaines; Delmar W. Robinson, Palatine, both of Ill.

[73] Assignee: UOP LLC, Des Plaines, Ill.

[21] Appl. No.: 724,652

[22] Filed: Oct. 3, 1996

Related U.S. Application Data

[60] Provisional application No. 60/005,764 Oct. 20, 1995.

[51] Int. Cl.⁶ .............................. B01J 38/42; B01J 20/34
[52] U.S. Cl. ............................................... 502/35; 502/34
[58] Field of Search ........................................ 502/34, 35

[56] References Cited

U.S. PATENT DOCUMENTS

| | | | |
|---|---|---|---|
| 3,647,680 | 3/1972 | Greenwood et al. | 208/65 |
| 3,652,231 | 3/1972 | Greenwood et al. | 23/288 |
| 3,692,496 | 9/1972 | Greenwood et al. | 23/288 G |
| 4,125,454 | 11/1978 | Clem et al. | 208/65 |
| 4,218,338 | 8/1980 | Huin et al. | 252/415 |
| 5,151,392 | 9/1992 | Fettis et al. | 502/37 |
| 5,227,566 | 7/1993 | Cottrell et al. | 585/660 |
| 5,336,834 | 8/1994 | Zarchy et al. | 585/737 |
| 5,457,077 | 10/1995 | Williamson et al. | 502/37 |

OTHER PUBLICATIONS

"Cat Reforming with In–Place Regeneration", written by W.H. Decker et al, published in the Jul. 4, 1995, issue of *The Oil and Gas Journal* beginning at p. 80.

Pp. 355–397 of book entitled *Progress in Catalyst Deactivation*, edited by J.L. Figueiredo, published by Martinus Nijhoff Publishers in Boston, Massachusetts in 1982 no month.

*Primary Examiner*—Michael L. Lewis
*Assistant Examiner*—Alexander G. Ghyka
*Attorney, Agent, or Firm*—Thomas K. McBride; John G. Tolomei; Michael A. Moore

[57] ABSTRACT

A method is disclosed for decreasing the emissions of chlorine-containing species from a process for contacting catalyst particles with a recycle stream containing chlorine-containing species. Prior to contacting the catalyst particles with the recycle gas, an effluent stream that contains chlorine-containing species contacts the catalyst particles at sorption conditions. The catalyst particles sorb the chlorine-containing species from the effluent stream. This method captures and returns to the process the chlorine-containing species that would be lost from the process and that would need to be replaced by the injection of make-up chlorine-containing species. This method results in a significant savings in capital and operating costs of the process. This method is adaptable to many processes for the catalytic conversion of hydrocarbons in which deactivated catalyst particles are regenerated.

23 Claims, 1 Drawing Sheet

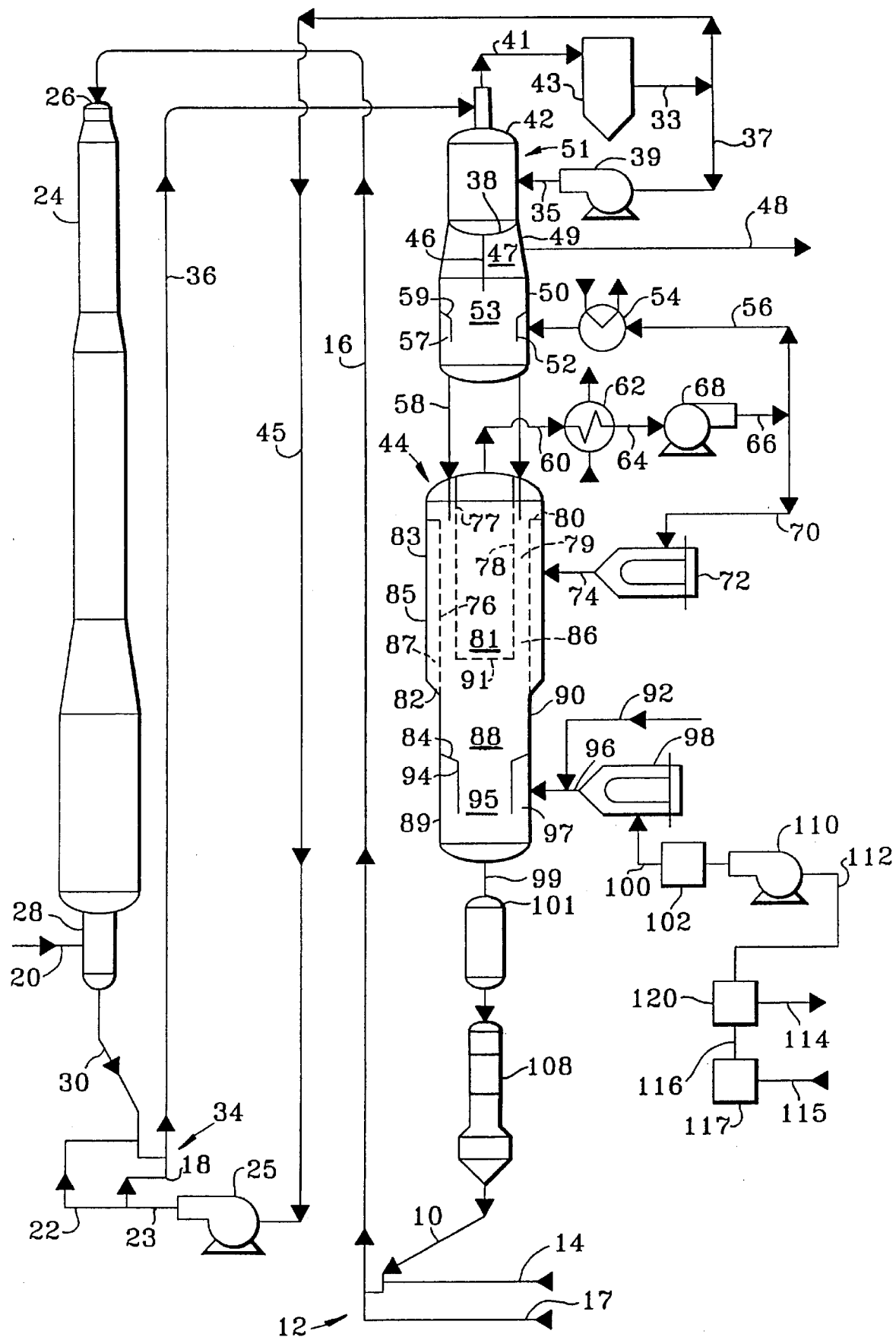

METHOD FOR REDUCING CHLORIDE EMISSIONS FROM A CATALYST REGENERATION PROCESS

CROSS-REFERENCE TO RELATED APPLICATION

This application claims the benefit of U.S. Provisional Application No. 60/005,764, filed on Oct. 20, 1995.

FIELD OF THE INVENTION

This invention relates generally to the regeneration of hydrocarbon conversion catalysts in the presence of a chlorine-containing species.

BACKGROUND OF THE INVENTION

Although catalysts for the conversion of hydrocarbons have a tendency to deactivate, usually a catalyst's activity may be restored by one of a number of processes that are known generally as regeneration processes. Regeneration processes are extensively used. What specific steps comprise a regeneration process depends in part on the reason for the deactivation. For example, if the catalyst deactivated because coke deposits accumulated on the catalyst, regeneration usually includes removing the coke by burning. If the catalyst deactivated because a catalytic metal such as platinum becomes agglomerated, regeneration usually includes redispersing the metal by contacting the catalyst with oxygen and chlorine. If the catalyst deactivated because a catalytic promoter such as chloride becomes depleted, regeneration usually includes replenishing the promoter by contacting the catalyst with a chlorine-containing species, which are referred to herein as chloro-species. Operating conditions and methods for these regeneration processes are well known. Regeneration processes can be carried out in situ, or the catalyst may be withdrawn from the vessel in which the hydrocarbon conversion takes place and transported to a separate regeneration zone for reactivation. Arrangements for continuously or semicontinuously withdrawing catalyst particles from a reaction zone and for reactivation in a regeneration zone are well known.

Many of these regeneration processes share the common feature of contacting the catalyst in the presence of one or more chloro-species that restore the activity of the catalyst for use in the reaction zone. These chloro-species may be chemically or physically sorbed on the catalyst as chloride or may remain dispersed in a stream that contacts the catalyst. In many regeneration processes, however, a flue gas stream containing the chloro-species is vented from the regeneration process. Several methods have been used for preventing contamination of the flue gas stream with the chloro-species and minimizing the release of the chloro-species in the flue gas stream from the regeneration process. Emissions of chloro-species, apart from the effect of the loss of chloride on the catalyst, pose environmental concern. The loss of chloride usually causes temporary deactivation that can be reversed by adding make-up chloride to the catalyst. The environmental concerns can be abated either by scrubbing the flue gas stream with an aqueous, basic solution that neutralizes the chloro-species or by adsorbing the chloro-species on an adsorbent. Scrubbing and adsorption are the two methods that are typically used when chloro-species are vented during regeneration of reforming catalysts and of catalysts for other hydrocarbon conversion processes, such as dehydrogenation, isomerization, alkylation, and transalkylation.

Although these two methods—scrubbing and adsorption—for decreasing the venting of chloro-species during catalyst regeneration are useful, they are also expensive to build and troublesome to operate. On the one hand, by introducing an aqueous solution into the process, scrubbing can actually increase the risk of downstream corrosion unless the alkalinity of the aqueous solution is carefully controlled. Moreover, because the aqueous solution must be replaced periodically, scrubbing gives rise to significant costs for supplying fresh solution and for disposing of the spent solution. On the other hand, although adsorption does not involve the introduction of an aqueous stream, the adsorbent also must be replaced periodically, and the cost of replacement of the adsorbent, including the cost of disposing of spent adsorbent, can far exceed the cost of replacement of the aqueous solution in scrubbing.

The problem of adsorbent replacement is compounded by water in the flue gas stream, and as a result traditional adsorbents are not economically viable for adsorbing chloro-species from flue gas streams. In order to be economically viable, an adsorbent, while removing a high proportion of the chloro-species from the flue gas stream, must adsorb typically from 7 to 8 percent of its weight in chloride. In order to adsorb that much chloride, the flue gas must have a low water content, typically less than 0.01 mol-% water. Water competes with chloro-species for adsorption sites on the adsorbent, and by occupying sites that would otherwise be occupied by chloro-species, water hinders the adsorption of chloride and hastens replacement of the adsorbent. Thus, if the flue gas has a high water content, the adsorbent adsorbs too much water and is incapable of adsorbing a viable amount of chloride. Because water is a common by-product of coke combustion as a result of the hydrogen-containing compounds typically found in coke, flue gas streams often do have a high water content, typically from 1 to 10 mol-%. As a consequence, unless the flue gas is dried an adsorbent will adsorb only one-third to one-half of the weight of chloride required for economic viability. This, in turn, doubles or triples the frequency of adsorbent replacement, thereby making traditional adsorbents uneconomical. Although in theory the adsorption of water can be mitigated by drying the flue gas stream prior to adsorbing the chloro-species, in fact a drier is costly as well as impractical because chloro-species such as hydrogen chloride tend to degrade most desiccants.

Thus, a process is sought for removing hydrogen chloride and other chloro-species from the flue gas streams of catalyst regeneration processes without the need for aqueous solutions, adsorbents, and desiccants.

SUMMARY OF THE INVENTION

It has been discovered that a spent catalyst having an alumina support entering a regeneration zone can sorb chlorine-containing species, which are referred to herein as chloro-species, from a flue gas stream from the regeneration zone, thereby dramatically reducing both the emissions of chloro-species from the regeneration zone as well as the make-up addition of chloro-species to the regeneration zone. In particular, this invention is applicable to regeneration zones that combust coke from coked, chloride-containing alumina particles, especially spent naphtha reforming catalysts and spent paraffin dehydrogenation catalysts. In order to take advantage of this property of these catalysts to sorb chloride from the flue gas, a chloride sorption step that can be readily integrated into existing regeneration processes without large capital expenditures or greatly increased complexity is provided.

In this invention, a sorption arrangement in combination with the regeneration section of a catalytic hydrocarbon conversion process retains chloro-species that would otherwise be released from the process. This invention uses a sorption zone to recycle the chloro-species to the regeneration zone. Unlike conventional adsorption methods of preventing release of chloro-species from catalytic regeneration zones by adsorbing chloro-species onto a separate adsorbent, this invention uses the catalyst entering the regeneration section to capture the escaping chloro-species and return chloride back to the regeneration section. This invention uses the catalyst entering the regeneration zone to keep the chloride in the regeneration zone, and, to sustain the chloride level on the catalyst.

It has been discovered that, even though the catalyst entering the regeneration zone is like traditional sorbents in that it is capable of sorbing up to, say, only about from 2 to 3 percent of its weight in chloride from a water-containing regeneration flue gas stream, a process that uses the catalyst entering the regeneration zone to sorb chloro-species from the regeneration flue gas stream can nevertheless be viable. Accordingly, in one of its embodiments, this invention is a process in which spent catalyst which is about to be regenerated is not passed to the regeneration zone but instead is first passed to an sorption zone. In the sorption zone, the spent catalyst particles sorb chloro-species from the regeneration zone flue gas. Because the regeneration flue gas has a high water content, the spent catalyst sorbs up to, say, only about from 2 to 3 percent of its weight in chloride. The spent catalyst, having sorbed what chloride it can, is withdrawn from the sorption zone and is passed then to the regeneration zone. Whatever additional chloride the spent catalyst sorbed in the sorption zone is brought into the regeneration zone, thereby decreasing the need to add make-up chloride to the regeneration zone. Meanwhile, the sorption zone is replenished with a continual stream of spent catalyst, which is capable of being supplied to the sorption zone at a rate that is more than sufficient to compensate for the fact that the catalyst sorbs only up to about 2 to 3 percent of its weight in chloride. In short, in this invention the abundant quantity of available catalyst for sorption more than compensates for what persons skilled in the art would consider a small and uneconomical amount of chloride sorbed by the catalyst. The benefits of this invention for the regeneration process include not only a decrease in the emissions of chloro-species but also a decrease in the chloride make-up rate.

In regeneration processes as currently commercially practiced, the flue gas from a zone where coke is combusted from chlorided platinum alumina catalysts typically contains from 10 to 500 mol-ppm chlorine and from 500 to 10000 mol-ppm hydrogen chloride. By practicing this invention in which a high proportion of the chlorine and hydrogen chloride in the flue gas is sorbed on the coked catalyst prior to the combustion of the coke, the chlorine concentration in the flue gas may be reduced to from 1 to 10 mol-ppm and the hydrogen chloride concentration may be reduced to from 10 to 1000 mol-ppm. The method of this invention can be used to replace or supplement conventional means for removing chlorine and hydrogen chloride from flue gas streams, such as scrubbing or adsorption. In either case, this invention significantly lowers the substantial costs of building and operating the conventional means of chloro-species removal. In addition, this invention reduces significantly the requirements for adding make-up chloride to the regeneration process, because this invention returns to the regeneration process a large portion of the chlorine or hydrogen chloride that would otherwise be removed from the process by conventional means of chloro-species removal. Thus, the method of this invention can eliminate or drastically reduce the problems and costs associated with regeneration processes that emit a flue gas stream containing hydrogen chloride or chlorine.

This invention is applicable to numerous hydrocarbon conversion processes and to their associated catalyst regeneration zones. A basic requirement for using this invention is a zone that contains catalyst or particles and that operates in the presence of chloride which is carried out of the zone in the form of a chloro-species by a flue gas stream. Examples of chloro-species that are released from the zone and are susceptible to recovery by the method of this invention include $Cl_2$ and HCl. Another basic requirement for using this invention is catalyst or particles that have sorption capacity for the chloro-species. This invention is not limited to any particular type of catalyst or particles; any catalysts or particles with the necessary capacity may be used. Preferably, the catalyst or particles will recover 50 wt-% and, more preferably, more than 90 wt-%, of the chloro-species in the effluent stream. The typical catalyst or particles for use in this invention comprise alumina, including alumina, activated aluminas, silica alumina, molecular sieves, and alumino-silicate clays such as kaolin, attapulgite, sepiolite, polygarskite, bentonite, and montmorillonite, particularly when the clays have not been washed by acid to remove substantial quantities of alumina. Reference is made to Zeolitic Molecular Sieves, by Donald W. Breck (John Wiley & Sons, 1974), which describes the use and selection of zeolite adsorbents and which is incorporated herein by reference.

The sorption and removal capacity of the catalyst or particles for the chloro-species must exist under a reasonable range of conditions. With respect to the removal capacity, the capability for chloride to be removed from the catalyst during regeneration is a necessary feature of the catalyst regeneration process to which the invention is applied. In other words, the conditions at which the regeneration process functions are conditions that are sufficient to remove chloride from the catalyst. As a practical matter, however, this requirement does not limit the scope of this invention in any significant way. With respect to the capacity of the catalyst or particles to sorb chloro-species, preferably the process conditions of the flue gas will complement the sorption requirements of the catalyst or the particles. In a surprising aspect of this invention, the sorption of chloro-species in the sorption zone is favored by a decrease rather than an increase in the pressure of the sorption zone. Although persons of ordinary skill in the art of sorption processes would have expected that a decrease in pressure would not have been beneficial for the sorption of gaseous chloro-species onto the catalyst or particles, it has been discovered that the opposite is true in the presence of water and at the temperatures of the sorption zone. It has been discovered that although a decrease in pressure causes the sorption of water from the flue gas onto the catalyst to decrease, the sorption of chloro-species does not decrease, even at the temperatures of the sorption zone. Therefore, a decrease in pressure selectively favors the sorption of chloro-species relative to that of water. Consequently, a preferred embodiment of this invention includes a sorption zone that operates at a pressure that is less than the pressure of the zone in which the chloride is removed from the catalyst or particles. A lower pressure may be compatible with some prior art hydrocarbon catalyst regeneration processes in which prior to the regeneration step the catalyst is employed for hydrocarbon conversion at pressure that is lower than the pressure of the regeneration step. In these prior art processes, it is beneficial to perform the sorption of the chloro-species on the catalyst prior to increasing the pressure of the particles for the regeneration step. Therefore, this invention may be adaptable to existing and prior art processes and achieve substantial benefits with a minimum of utility requirements and additional capital expenses.

This invention is not limited to the recovery and recirculation of a single chloro-species from the regeneration zone, but may include arrangements for the recovery of two or more chloro-species. Preferably, the catalyst or particles in a single sorption zone will retain all of the chloro-species that are removed from the catalyst or particles into the flue gas and that are desired to be sorbed from the flue gas stream. Where necessary, multiple sorption zones with the catalyst or particles in each zone but operating at different sorption conditions may be used to recover the various chloro-species from the flue gas stream.

Thus, this invention uses sorption and removal steps in a catalyst regeneration or particle treatment process that results in the recovery and return of chloro-species to the process. The process is compatible with a wide variety of catalyst regeneration sections for hydrocarbon conversion processes. This compatibility can minimize utility costs by operating at conditions which are in harmony with the typical process conditions and existing process steps.

It is an object of this invention to improve processes for regenerating hydrocarbon conversion catalysts.

It is another object of this invention to make better use of chloro-species that are present during catalyst regeneration.

A further object of this invention is to decrease the costs that are incurred in venting chloro-species from catalyst regeneration processes.

Accordingly, this invention is in one embodiment a method for decreasing the environmental release of chloro-species from a process for regenerating spent catalyst particles with a recycle stream comprising chloro-species. A first portion of a recycle stream which comprises a chloro-species is passed to a regeneration zone which contains chlorided catalyst particles. The regeneration zone operates at regeneration conditions and at least a portion of the chlorided catalyst particles are at least partially regenerated, thereby producing regenerated catalyst particles. Also in the regeneration zone at least a portion of the chloride is removed from the chlorided catalyst particles. A recycle stream comprising the chloro-species is withdrawn from the regeneration zone. A second portion of the recycle stream is passed to a sorption zone which contains spent catalyst particles. In the sorption zone at sorption conditions, at least a portion of the chloro-species is sorbed on the spent catalyst particles, thereby producing the chlorided catalyst particles. The chlorided catalyst particles have an increased content of chloride relative to the spent catalyst particles. A vent stream, which has a reduced concentration of the chloro-species relative to the second portion of the recycle stream is withdrawn from the sorption zone.

In a more limited embodiment, this invention is a process for the catalytic conversion of a hydrocarbon feedstock in the presence of chloride. A hydrocarbon feedstock is passed to a reaction zone and is contacted with a catalyst in the presence of chloride, and a hydrocarbon product is recovered. Deactivated catalyst particles comprising chloride are removed from the reaction zone, and at least partially regenerated catalyst particles are added to the reaction zone. Deactivated catalyst particles are passed from the reaction zone to a sorption zone. A first portion of a recycle stream which comprises a chloro-species is passed to the sorption zone which operates at sorption conditions. At least a portion of the chloro-species is sorbed on the deactivated catalyst particles, thereby producing chlorided catalyst particles having an increased content of chloride relative to the deactivated catalyst particles. A vent stream having a reduced concentration of the chloro-species relative to the first portion of the flue stream is withdrawn from the sorption zone. Chlorided catalyst particles are passed from the sorption zone to a regeneration zone. A second portion of the recycle stream comprising the chloro-species is passed to the regeneration zone which operates at regeneration conditions. In the regeneration zone, the chlorided catalyst particles are at least partially regenerated and at least a portion of the chloride is removed from the chlorided catalyst particles, thereby producing regenerated catalyst particles which are withdrawn from the regeneration zone. The recycle stream comprising the chloro-species is withdrawn from the regeneration zone.

In another more limited embodiment, this invention is a process for reforming a hydrocarbon feedstock. A hydrocarbon feedstock is passed to a catalytic reforming reaction system and contacted with regenerated catalyst particles. The regenerated catalyst particles comprise chloride, platinum metal, and an alumina support. The hydrocarbon feedstock undergoes reforming reactions and coke is deposited on the catalyst. A hydrocarbon product is recovered. Deactivated catalyst particles comprising chloride and having coke deposits are at least semicontinuously removed from the reforming reaction system and at least partially regenerated catalyst particles are added to the reforming reaction system. Deactivated catalyst particles are passed from the reforming reaction system to a sorption zone. A first portion of a recycle stream comprising oxygen and at least one of chlorine and hydrogen chloride is cooled to produce a cooled first portion of the recycle stream, which is passed to the sorption zone. At least a portion of the chlorine or hydrogen chloride is sorbed from the cooled first portion of the recycle stream on the deactivated catalyst particles at sorption conditions, thereby producing chlorided catalyst particles that have an increased content of chloride relative to the deactivated catalyst particles. A vent stream having a reduced concentration of chlorine or hydrogen chloride relative to the cooled first portion of the recycle stream is withdrawn from the sorption zone. The chlorided catalyst particles are passed from the sorption zone to a combustion zone of a regeneration zone. A second portion of the recycle stream comprising oxygen and at least one of chlorine and hydrogen chloride is passed to the combustion zone. At regeneration conditions, chloride and at least a portion of the coke is removed from the chlorided catalyst particles. The regeneration conditions include an increased temperature relative to the sorption conditions. Combusted catalyst particles and a flue stream comprising chlorine or hydrogen chloride are produced. Combusted catalyst particles are withdrawn from the combustion zone and are passed to a redispersion zone of the regeneration zone. A redispersion stream comprising oxygen and chlorine is passed to the redispersion zone. The platinum metal on the combusted catalyst particles is redispersed and water is removed from the combusted catalyst particles. Redispersed catalyst particles are withdrawn from the redispersion zone. An internal stream comprising oxygen and at least one of chlorine and hydrogen chloride is also withdrawn from the redispersion zone. At least a portion of the internal stream is passed to the combustion zone. The portion of the internal stream is combined with the flue stream to form the recycle stream, which comprises oxygen and at least one of chlorine and hydrogen chloride. The recycle stream is withdrawn from the combustion zone. The redispersed catalyst particles are passed from the redispersion zone to a reduction zone. In the reduction zone, the redispersed catalyst particles are contacted with a hydrogen-rich gas. Regenerated catalyst particles are recovered from the reduction zone for return to the reaction zone.

Other objects, embodiments and details of this invention are presented in the following detailed description of the invention.

INFORMATION DISCLOSURE

U.S. Pat. No. 3,652,231 (Greenwood et al.) shows a regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with regeneration of reforming catalyst. The teachings of patents ('231, '680, and '496) are hereby incorporated in fill into this patent application.

U.S. Pat. No. 5,336,834 (Zarchy et al.) discloses an adsorption zone in combination with a catalytic hydrocarbon conversion process that keeps chlorine-containing compounds in the reaction zone and prevents contamination of product streams with chlorine-containing compounds.

U.S. Pat. No. 4,218,338 (Huin et al.) discloses a process for regenerating a hydrocarbon conversion catalyst wherein the gas discharged from the regeneration zone is cooled, subjected to double washing, dried, compressed, heated, and reused in the regeneration zone.

Temperature control and chloride management during regeneration of fixed beds of catalyst are described in the article entitled "Cat Reforming With In-Place Regeneration," written by W. H. Decker et al., and published in the Jul. 4, 1955, issue of The Oil and Gas Journal beginning at page 80, and in the discussion at pages 355–397 in the book entitled *Progress in Catalyst Deactivation*, edited by J. L. Figueiredo, and published by Martinus Nijhoff Publishers in Boston, Mass. in 1982.

BRIEF DESCRIPTION OF THE DRAWINGS

The FIGURE is a schematic illustration of a sorption zone with a regeneration zone.

DETAILED DESCRIPTION OF THE INVENTION

This invention can be used to reduce the emissions of halogen-containing species from any process that uses particles containing an inorganic oxide that can sorb halogen-containing species and from which halogens can be removed. Although halogens may include fluorine, bromine, and iodine, the preferred halogen is chlorine. Accordingly, this invention is particularly applicable to reducing the emissions of chloro-species. The term "chloro-species" herein refers to any molecule that contains chlorine, other than the chloride component or chloride entities that exist on the particles. For example, chloro-species include chlorine, hydrogen chloride, chlorinated hydrocarbons with or without oxygen, and compounds containing chlorine and a metal. The term "chlorine" herein refers to elemental chlorine, which exists as a diatomic molecule at standard conditions. The term "chloride" when used alone herein refers to the chloride component or chloride entities that exist on the particles. Chloride on the particles is believed to exist as various compounds depending on the composition and conditions of the particles. For example, if the particles contain alumina then the chloride may exist on the particles as an entity consisting of chlorine, oxygen, hydrogen, and aluminum atoms.

Generally, the particles that can sorb and desorb chloro-species comprise inorganic oxides, preferably alumina. The alumina may be present alone or it may be combined with a porous inorganic oxide diluent as a binder material. Alumina having a high surface area is preferred. The alumina may be present in any of its solid phases, but gamma-alumina is preferred. The alumina may also be present as a chemical combination with other elements such as silica-aluminas or alumino-silicate clays, as described in the Summary of the Invention. Because many hydrocarbon conversion catalysts comprise alumina, the hydrocarbon conversion catalysts that may be used with this invention are numerous. They include catalysts for reforming, dehydrogenation, isomerization, alkylation, transalkylation, and other catalytic conversion processes. These catalysts are well known. See, for example, U.S. Pat. Nos. 2,479,110 and 5,128,300 (reforming); 4,430,517 and 4,886,928 (dehydrogenation); 2,999,074 and 5,017,541 (isomerization); 5,310,713 and 5,391,527 (alkylation); and 3,410,921 (transalkylation). The teachings of these patents are incorporated herein by reference.

It is believed that the most widely-practiced processes that produce effluent streams containing chloro-species and that also employ alumina-containing particles are hydrocarbon conversion processes. The most widely practiced hydrocarbon conversion process to which the present invention is applicable is catalytic reforming. Therefore the discussion of the invention herein will refer to its application to a catalytic reforming reaction system. It is not intended that this limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (82° C.) and an end boiling point of about 400° F. (204° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chloride. Alumina is a commonly used carrier. The preferred alumina materials are known as the gamma, eta and theta alumina with gamma and eta alumina giving the best results. An important property related to the performance of the catalyst is the surface area of the carrier. Preferably, the carrier will have a surface area of from 100 to about 500 $m^2/g$. It has been discovered that the greater the surface area of the carrier, the greater is the capacity of the catalyst to sorb chloride according to the method of this invention. The particles are usually spheroidal and have a diameter of from about 1/16th to about 1/8th inch (1.5–3.1 mm), though they may be as large as 1/4th inch (6.35 mm). In a particular regenerator, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

The present invention is applicable to fixed- or moving-bed reaction zones and fixed- or moving-bed regeneration zones. Where the reaction is performed in one or more fixed beds, regeneration also may be performed in a fixed bed, and each fixed bed may be alternately contacted with one or more gas streams for reaction and for regeneration. But the preferred form of a reforming process is a moving bed reaction zone and a moving bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a hereinafter described multi-step regeneration process is used to regenerate the catalyst to restore its full reaction promoting ability. Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it is semicontinuous. By semicontinuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

Reforming processes may comprise two other types of operations, i.e., a semiregenerative operation and a cyclic operation. In practicing the semiregenerative operation, the catalyst is maintained in continuous use over an extended period of time, say from five months to a year or more depending on the quality of the catalyst and the nature of the feedstock. Following this extended period of operation, the reforming reactor is taken off stream while the catalyst is regenerated. In practicing the cyclic operation, the catalyst is generally regenerated with a greater frequency than in practicing the semiregenerative operation. The cyclic operation utilizes a multiple fixed bed reactor system arranged for serial flow of the feedstock in such a manner that at least one reactor can be taken off stream while the catalyst is regenerated. One or more companion reactors remain on stream, or go on stream, to replace the reactor that is off stream. Subsequently, the reactor with its catalyst regenerated is placed on stream while another reactor is taken off stream and its catalyst bed is regenerated in like manner.

When using the method of this invention in a semiregenerative, cyclic, batch, continuous, or semicontinuous catalyst regeneration zone, the catalyst is contacted with a hot gas stream containing chloro-species, which is known in reforming processes as recycle gas and is circulated to the zone, and a flue gas that also contains chloro-species is withdrawn from the zone. This method of contacting the catalyst can be used to perform a variety of catalyst regeneration steps depending on the condition of the catalyst and the nature of the gas stream.

A common example of a catalyst regeneration step that can be performed by circulating a recycle gas through and withdrawing a flue gas from a catalyst regeneration zone is coke combustion. If the recycle gas stream contains a low concentration of oxygen of typically from 0.5 to 1.5 vol-%, coke which could have accumulated on surfaces of the catalyst while it was in the hydrocarbon conversion reaction zone, may be removed by combustion. Coke is comprised primarily of carbon but is also comprised of a relatively small quantity of hydrogen, generally from 0.5 to 10 wt-% of the coke. The mechanism of coke removal is oxidation to carbon monoxide, carbon dioxide, and water. The coke content of spent catalyst may be as much as 20% by weight of the catalyst weight, but from 5 to 7% by weight is a more typical amount. Within the combustion section, coke is usually oxidized at temperatures ranging from 900° to 1000° F. (482° to 538° C.), but temperatures in localized regions may reach 1100° F. (593° C.) or more. Because of these high temperatures and also because of high water concentrations, catalyst chloride is quite readily removed from the catalyst during coke combustion. The presence of the chloro-species in the combustion recycle gas can help to prevent too much catalyst chloride from being stripped away, and can also help prevent the catalyst metal from agglomerating. Coke combustion consumes oxygen, so a small stream of make-up gas is added to the combustion recycle gas to replace the consumed oxygen, and a small amount of flue gas is vented off to allow for the addition of the make-up gas. The steady addition of make-up gas and the venting of flue gas establishes a steady state condition that produces a nearly constant concentration of chloro-species, as well as of water and oxygen, in the combustion recycle gas and in the flue gas. The operating variables that affect the water concentration of the combustion recycle gas are described in U.S. Pat. Nos. 5,001,095 (Sechrist) and 5,376,907 (Sechrist), the teachings of which are incorporated herein by reference.

Another example of a catalyst regeneration step that can be performed by circulating a recycle gas through and withdrawing a flue gas from a catalyst regeneration zone is redispersion of the catalyst metal. The recycle gas that is employed in redispersion generally contains a higher concentration of oxygen than for coke combustion, usually from 2 to 21 vol-%. The redispersion recycle gas also generally contains either chlorine or another chloro-species that can be converted in the regeneration zone to chlorine. The chlorine or chloro-species is generally introduced in a small stream of carrier gas that is added to the redispersion recycle gas, and so a small amount of flue gas is vented off to allow for the addition of the carrier gas. The steady addition of carrier gas and the venting of flue gas establishes a steady state condition that produces a nearly constant concentration of chlorine or chloro-species in the redispersion recycle gas and in the flue gas. Although the actual mechanism by which chlorine redisperses catalyst metal is the subject of a variety of theories, it is generally recognized that the metal may be redispersed without increasing the catalyst chloride content. In other words, although the presence of chlorine is a requirement for metal redispersion to occur, once the metal has been redispersed it is not necessary that the catalyst chloride content be maintained above that of the catalyst prior to redispersion. Thus, the agglomerated metal of a catalyst can be redispersed without a net increase in the overall chloride content of the catalyst.

A third example of a catalyst regeneration zone that circulates a recycle gas and withdraws a flue gas is rechloriding of the catalyst. Although the rechloriding recycle gas must contain a chloro-species, the rechloriding recycle gas generally does not require the presence of oxygen unless it is needed to decompose the chloro-species in order to deposit chloride on the catalyst. The chloro-species is generally introduced in a small stream of carrier gas that is added to the rechloriding recycle gas, and so a small amount of flue gas is vented off to allow for the addition of the carrier gas. Like coke combustion and metal redispersion, rechloriding that adds carrier gas and vents flue gas establishes steady state concentrations of chlorine or chloro-species in the rechloriding recycle gas and in the flue gas.

The majority of the description of the embodiments of this invention is presented in terms of a combustion section of a reforming catalyst regeneration zone because this is believed to be the most common application of this invention. However, this description is not intended to limit the scope of this invention as set forth in the claims. The catalyst particles in the combustion zone of the regeneration zone can be contained in an elongated bed having two elongated sides. In such an arrangement, the two elongated sides are open for transverse gas flow through the catalyst bed. Catalyst from the reaction section is referred to herein as spent catalyst or as deactivated catalyst. Catalyst particles move axially along the bed by withdrawing catalyst particles depleted in coke deposits by combustion from the outlet end of the bed and adding catalyst particles containing coke deposits to the inlet end of the bed. Catalyst that is withdrawn from the combustion zone is referred to herein as combusted catalyst. The coke content of the combusted catalyst may be 0.01% by weight of the catalyst weight or less, but generally it is approximately 0.2% by weight or less.

Generally, the make-up gas to the combustion section of a reforming catalyst regeneration zone comprises air and most of the oxygen in the make-up air is consumed in the combustion of coke. Therefore, the flue gas generally, contains from 70 to 80 mol-% nitrogen, from 10 to 20 mol-% carbon oxides, which is mainly carbon dioxide with trace amounts of carbon monoxide, and from 0.2 to 2.0 mol-% oxygen. Oxygen might, however, not be present in the flue gas stream if all of the oxygen is consumed in the combustion of coke in, for example, a multistage combustion zone. While nitrogen, carbon oxides, and oxygen are typical but not required components of the gas stream that is passed to the sorption zone, the gas stream must contain a chloro-species, such as hydrogen chloride or chlorine. The concentration of hydrogen chloride in the flue gas stream to the sorption zone is generally from 500 to 10000 mol-ppm, and preferably from 1000 to 5000 mol-ppm. The concentration of chlorine in the flue gas stream to the sorption zone is generally from 10 to 500 mol-ppm, and preferably from 25 to 100 mol-ppm. Water may also be present in the flue gas stream. The concentration of water in the flue gas stream to the sorption zone is generally from 1 to 20 vol-%, and preferably from 2 to 5 vol-% because water competes with chloro-species for sorption on the catalyst particles in the sorption zone. The flue gas stream may also contain trace amounts of other volatile chloro-species such as chlorinated hydrocarbons and chlorinated metals.

Sulfur, in the form of sulfur oxides such as sulfur dioxide and sulfur trioxide, is often present in the flue gas streams of commercial catalyst regeneration processes. Hydrocarbon feedstocks are often contaminated with low concentrations of sulfur, some of which can sorb or deposit on the catalyst in the reaction zone. When spent catalyst containing sulfur enters a regeneration zone, the sulfur is typically converted to sulfur dioxide and trace amounts of sulfur trioxide, which appear in the flue gas of the regeneration zone. These sulfur oxides can harm the performance of the catalyst by forming sulfates on the catalyst or by agglomerating the platinum metal. In order to avoid these harmful effects, it is preferred that the sulfur concentration of the hydrocarbon feedstock be maintained as low as possible in order to minimize the presence of the sulfur oxides in the flue gas.

When using the method of this invention, a portion of the flue gas stream is passed to a sorption zone which uses spent catalyst particles, which have not yet passed to the combustion zone, to remove chloro-species from the flue gas. Unlike prior art processes, the method of this invention does not use a separate adsorbent to adsorb the chloro-species from the flue gas stream, but instead this invention uses the catalyst particles themselves for the sorption. The sorption zone can be any of the well-known arrangements for contacting solid particles with a gas stream and sorbing components from the gas stream onto the solid particles. Sorption can be performed in a fixed bed, and in that case regeneration also may be performed in a fixed bed, with each fixed bed alternately being contacted with a gas stream for sorption and with a gas stream for regeneration. Although the sorption zone can comprise a fixed catalyst bed or a fluidized catalyst bed, the preferred sorption zone comprises a moving catalyst bed. The direction of the gas flow is preferably countercurrent relative to the direction of movement of the catalyst, but the direction of gas flow can also be cocurrent, crosscurrent, or a combination of countercurrent, cocurrent, and crosscurrent. The shape of the catalyst bed can be rectangular, annular, spherical, or any suitable shape, but the preferred shape is cylindrical. The distributor for the gas flow to the catalyst bed may be of any suitable type, but preferably it is an annular distributor of the type disclosed in U.S. Pat. Nos. 4,662,081 (Greenwood) and 4,665,632 (Greenwood), the teachings of which are incorporated herein by reference.

The sorption zone is operated at sorption conditions effective to sorb at least a portion of the chloro-species from the flue gas stream. The chloride content of the spent catalyst entering the sorption zone may be as much as 5% by weight of the catalyst weight, but from 0.1 to 2.0% is a more typical amount. Catalyst that is withdrawn from the sorption zone is referred to herein as chlorided catalyst. Although the spent catalyst particles that sorb chloro-species in the sorption zone have a higher coke content than fresh catalyst particles, it has been discovered that spent catalyst particles have surprisingly similar capabilities for chloride retention as fresh catalyst particles, and hence combusted and regenerated catalyst particles. Thus, in order for sorption of chloro-species to occur in the sorption zone the operating conditions in the sorption zone must be more favorable than the operating conditions of the combustion zone for sorption of chloro-species. Generally, these more favorable conditions in the sorption zone include a reduced temperature, a reduced pressure, or a reduced water content of the gas that contacts the catalyst. Preferably, the sorption zone operates at a reduced temperature relative to the combustion zone.

A cooler temperature in the sorption zone relative to the combustion zone can be achieved in a variety of ways. Although the catalyst can be cooled prior to entering the sorption zone or the sorption zone may be equipped with cooling means to cool the flue gas or catalyst within the sorption zone, the preferred method of maintaining a cooler temperature in the sorption zone is by cooling the flue gas after leaving the combustion zone and prior to entering the sorption zone. The flue gas can be cooled by any suitable cooler, but an air-cooled shell-and-tube heat exchanger having the flue gas within the tubes is preferred. After cooling, the temperature of the flue gas is generally from 150° to 900° F. (66° to 482° C.) and preferably from 300° to 500° F. (149° to 260° C.). In adapting this invention to a regeneration process that already uses a prior art scrubbing or adsorptive process and that already has an existing cooler for cooling the flue gas entering the scrubber or the adsorptive bed, that existing cooler can be used effectively to cool the flue gas. In order to maximize heat integration and the energy efficiency of the sorption zone, the flue gas can be heat-exchanged with the exiting chlorided catalyst particles, or the effluent gas can be heat-exchanged with the entering spent catalyst particles, depending on the embodiment of the invention. The temperature in the sorption zone and in any coolers if present is preferably maintained above the dew point temperature of the gas in order to minimize the possibility of condensing corrosive acidic liquid in any equipment. The temperature of the spent catalyst particles entering the sorption zone is generally from 150° to 900° F. (66° to 482° C.) and preferably from 300° to 500° F. (149° to 260° C.).

A lower pressure in the sorption zone relative to the combustion zone can be achieved by numerous methods, the simplest being a pressure-reducing valve located in the conduit for the flue gas between the combustion zone and the sorption zone. The pressure of the sorption zone is generally from 0 to 500 psi (0 to 3447 kPa) absolute and preferably from 15 to 100 psi (103 to 689 kPa). The pressure of the sorption zone is generally from 5 to 100 psi (34 to 689 kPa), and preferably from 15 to 50 psi (103 to 344 kPa) less than the pressure of the combustion zone. Embodiments of this invention where the pressure of the sorption zone is less than the pressure of the combustion zone are especially adaptable to hydrocarbon processing units with continuous catalyst regeneration sections where the pressure of the last reaction zone through which the catalyst passes prior to regeneration is less than the pressure of the regeneration section. In these embodiments, the pressure of the sorption zone is preferably maintained approximately at the pressure of the last reaction zone, and the pressure of the chlorided catalyst is increased to the pressure of the combustion zone after sorption by conventional means such as a valved or valveless lock hopper.

A decrease in the water content of the flue gas that contacts the catalyst in the sorption zone promotes sorption of chloro-species by decreasing the water that is present and capable of competing with the chloro-species for sorption on the spent catalyst particles. Although not necessary, drying the flue gas stream prior to its entering the sorption zone is a preferred method of performing this invention. The water in the flue gas can be removed by passing the flue gas stream prior to entering the sorption zone through an adsorbent such as silica gel that preferentially adsorbs water but not chloro-species. Although silica gel deteriorates over time in the presence of water and some chloro-species, a bed of silica gel can be used or sacrificed to remove water from the flue gas until the silica gel becomes unusable. Then, the deteriorated bed of silica gel can be replaced with a fresh bed of silica gel. Because silica gel is both abundant and relatively inexpensive, silica gel is a convenient and economical adsorbent to sacrifice for the purpose of removing water but not chloro-species from the flue gas stream.

The ability of the catalyst to sorb chloro-species in the sorption zone can also be enhanced by drying the spent catalyst particles prior to entering the sorption zone. Water that is already sorbed on the spent catalyst particles before the particles enter the zone occupies sites that would otherwise be available for sorption of chloro-species. Thus, as with drying the flue gas, drying the spent catalyst particles is a preferred but not necessary method of performing this invention. The water content of the spent catalyst particles is generally less than 1 wt.-% and preferably less than 0.1 wt.-%. For a typical spent hydrocarbon conversion catalyst, the water content is, however, usually less than 0.1 wt-% and is therefore neither a significant factor nor an important variable for chloride sorption.

Sorption conditions also include a gas hourly space velocity of generally from 5 to 20000 $hr^{-1}$ and preferably from 10 to 1000 $hr^{-1}$, and a particle residence time of generally from 0.1 to 10 hours and preferably from 2 to 4 hours. Persons skilled in the art are aware that the temperature within the sorption zone is influenced not only by the temperatures but also by the thermal mass flow rates of the flue gas and spent catalyst particles. Thus, in order to achieve a desired sorption temperature, it may be necessary to adjust the flow rates of flue gas and spent catalyst particles relative to each other.

The make-up gas that enters the combustion zone contains an oxygen-containing species such as molecular oxygen. There are some advantages to raising the concentration of oxygen in the make-up gas stream. The concentration of oxygen in the combustion zone depends on the amount of oxygen added to the combustion zone. By increasing the concentration of oxygen in the make-up gas, a smaller quantity of make-up gas must be added to the regeneration process in order to maintain a given oxygen concentration in the combustion zone. So, the addition of less make-up gas results in the passing of less flue gas out of the combustion zone. This in turn decreases the flow rate of gas to the sorption zone, thereby increasing the ratio of catalyst flow to gas flow through the sorption zone and improving the efficiency of sorption of chloro-species in the sorption zone. Thus, a preferred embodiment of this invention uses an oxygen-enriched air stream for make-up gas to the combustion zone. A number of processes are known for enriching air streams with oxygen. These processes can use selective adsorbents, gas permeable membranes or a combination of both to generate such streams. One such process that uses a gas permeable membrane to enrich an oxygen stream and produce a non-permeate stream with an increased nitrogen concentration is shown in U.S. Pat. No. 4,787,919, the teachings of which are herein incorporated by reference. Additional diffusion membranes for the separation of gases are also shown in U.S. Pat. No. 3,830,733, the teachings of which are incorporated by reference. These and other commercially available processes can economically produce oxygen-enriched gas streams having concentrations of 39 mole percent. Air separation processes are beneficial since they provide oxygen-enriched streams that can be used in the combustion step of the regeneration zone. Nevertheless, this invention does not require the use of any particular source of oxygen-enriched gas streams for use in the combustion step.

The FIGURE illustrates a reactor and regenerator system for a reforming reaction zone that uses the sorption system of this invention to remove chloro-species from the flue gas stream of a regeneration zone. Starting with the movement of partially-regenerated catalyst, a lower conduit 10 supplies catalyst particles that have not been reduced but have been oxidized to a nonmechanical valve 12. A regulating fluid preferably comprising hydrogen enters valve 12 through a conduit 14 at a rate that regulates the transfer of catalyst particles through the valve 12 into a lift conduit 16. Non-mechanical valve 12 can take on forms such as L valves, J valves, and K valves. Non-mechanical valves are well known, and further information on the operation of such valves can be found in an article titled, "L Valves Characterized for Solid Flow," HYDROCARBON PROCESSING, March 1978, page 149, in a text titled GAS FLUIDIZATION TECHNOLOGY, edited by D. Geldart, John Wiley & Sons, 1986, and in U.S. Pat. No. 4,202,673, the contents of which are hereby incorporated by reference. As catalyst particles enter lift conduit 16, a lift fluid which preferably comprises hydrogen enters the bottom of the lift conduit through a conduit 17 and transports the catalyst particles upwardly through lift conduit 16 to the top 26 of the stacked reactor arrangement 24, which the particles and lift fluid enter.

Catalyst flows from the top to the bottom of the stacked reactor arrangement 24, passing first through a reduction zone, in which a hydrogen-rich gas contacts and reduces the oxidized catalyst particles, and from there through multiple stages of reaction in which process fluids contact the catalyst particles. Details of the contacting beds and other internals of the stacked reactor arrangement 24 are well known to those skilled in the art and permit continuous or intermittent flow of the catalyst particles from the top 26 of the stacked reactor arrangement to a lower retention chamber 28 at the bottom of the stacked reactor arrangement. A purging fluid preferably comprising hydrogen enters lower retention chamber 28 through a conduit 20 at a rate that purges hydrocarbons from the catalyst particles in lower retention chamber 28.

Spent catalyst particles containing coke deposits flow from the bottom of the stacked reactor arrangement 24 through a lower conduit 30 that displaces hydrogen and hydrocarbons from the stream of spent catalyst particles to prevent any carry-over of hydrogen and hydrocarbon to the regenerator side of the process. At the bottom of lower conduit 30, a non-mechanical valve 34 operates in a manner similar to that described for non-mechanical valve 12 to transfer spent catalyst particles upwardly through a lift conduit 36. A regulating fluid enters valve 34 through a conduit 22 and a lift fluid enters the bottom of the lift conduit through a conduit 18. Both fluids are provided through a conduit 23 from a blower 25.

Spent catalyst particles travel up through lift conduit 36 in a manner similar to that described for lift conduit 16, into a disengaging section 42 of a disengaging-sorption vessel 51. Disengaging-sorption vessel 51 is a stacked arrangement of two sections of contacting in which process fluids contact the spent catalyst particles. An upper disengaging section 42 is separated from a lower sorption section 50 by an internal head 38. A frusto-conical transition section 49 connects the disengaging section 42 to the sorption section 50. An internal conduit 46 extends downward from the internal head 38 and permits continuous or intermittent flow of the spent catalyst particles from the disengaging section 42 to the sorption section 50.

In an upper portion of the disengaging section 42, an elutriation fluid enters disengaging section 42 through a conduit 35 at a rate that separates broken or chipped catalyst particles and catalyst fines from the whole catalyst particles which exit the bottom of the disengaging section 42. The catalyst chips and fines pass through a conduit 41 and are filtered from the elutriation fluid in conduit 33 in a dust collector 43. Some of the elutriation fluid in conduit 33 is recycled to the disengaging section 42 through a blower 39, a conduit 37, and the conduit 35. Some of the elutriation fluid in conduit 33 is recycled through the conduit 45 to the blower 25. Thus, in this embodiment the same fluid, which is preferably nitrogen, is used for the elutriation fluid, the regulating fluid to valve 34, and the lift fluid to lift conduit 36.

After removal of catalyst chips and fines in the upper portion of the disengaging section 42, the spent catalyst particles flow downwardly in essentially dense phase flow through the lower portion of the disengaging section 42. The disengaging section 42 maintains a volume of catalyst particles to balance transitory differences in the flow that may occur during intermittent transport of catalyst particles through the reactor stack 24 and the regenerator vessel 44. The internal conduit 46 transfers spent catalyst particles to the sorption section 50. The spent catalyst particles flow downwardly in essentially dense phase flow through the sorption section 50. The sorption section 50 maintains a volume of catalyst that sorbs most of the hydrogen chloride and chlorine that are present in a flue gas stream that is vented from the regenerator vessel 44. The flue gas stream contains from 1000 to 5000 mol-ppm hydrogen chloride and from 25 to 100 mol-ppm chlorine. The flue gas stream is withdrawn from a hereinafter-described flue gas/recycle gas stream that flows through conduit 66. The flue gas stream passes through a conduit 56 to a cooler 54. Cooler 54 reduces the temperature of the flue gas stream to a temperature at which the catalyst in the sorption section 50 is maintained. Typically, the flue gas stream enters cooler 54 at from 700° to 1000° F. (371° to 538° C.), and exits cooler 54 at from 300° to 500° F. (149° to 260° C.). In order to minimize the possibility of corrosion due to condensation of droplets of hydrochloric acid from the flue gas stream, preferably the exit temperature of cooler 54 is not below the dew point of the flue gas stream.

After cooling, the flue gas stream enters the sorption section 50. The sorption zone 53 in the sorption section 50 is formed by a baffle having a vertically-extended cylindrical section 52 that is concentrically located with respect to the disengaging-sorption vessel 51. The cooled flue gas stream enters into an annular volume 57 that distributes the gas. Distributing volume 57 is defined by the wall of sorption section 50 and the baffle consisting of the concentric cylinder 52 that is secured to the wall of the sorption section 50 by frusto-conical section 59. An open bottom of the annular distributing volume 57 allows gas to be distributed about the entire circumference of the distributing volume 57 and about the sorption zone 53. Catalyst duration within the sorption zone 53 is governed principally by the length of cylindrical section 52. In this example, the sorption zone 53 has a sufficient length to provide approximately a two-hour residence time for the spent catalyst particles located therein.

A flue gas stream exits the top of the catalyst bed of the sorption zone 53. The top of the catalyst bed 53 is generally at the elevation of the lower end of the internal conduit 46. Thus, a space 47 is defined by the top of the catalyst bed 53, the bottom of the internal head 38, the outer surface of the wall of the conduit 46, and the inner surface of the wall of the transition section 49. Within this space 47, the flue gas stream disengages from the catalyst particles. The flue gas stream exits the disengaging-sorption vessel 51 via a vent conduit 48. The concentration of hydrogen chloride in the flue gas stream passing through conduit 48 is generally from 10 to 1000 mol-ppm, and preferably from 50 to 500 mol-ppm. The concentration of chlorine in the flue gas stream passing through conduit 48 is generally from 1 to 100 mol-ppm, and preferably from 1 to 10 mol-ppm. The chloride content of the chlorided catalyst leaving the sorption zone 53 could be as much as 7% by weight of the catalyst weight if the flue gas stream is sufficiently dry and the contact time is sufficiently long, but from 0.8 to 1.2% is a more typical amount.

For a sorption section of the kind shown in the FIGURE, the rate of catalyst movement through the cylindrical sorption zone 53 may range typically from 200 to 6000 pounds per hour (90.7 to 2721.6 kilograms per hour). Typical bed lengths for this range of catalyst flow rate are from 4 to 20 feet (1.22 to 6.1 meters). The diameter of the cylindrical bed will typically range from 3 to 20 feet (0.91 to 6.10 meters). For example, for a catalyst flow rate of 2000 pound per hour (907.2 kilogram per hour), a cylindrical catalyst bed may be 10 feet (3.05 meters) in diameter and 13 feet (3.96 meters) in length. Where higher catalyst flow rates are used, larger bed diameters may be required.

If, despite the sorption of most of the chlorine and hydrogen chloride from the flue gas stream, the concentration of chlorine or hydrogen chloride in the flue gas stream exiting through conduit 48 is still unacceptably high, then the flue gas stream may be passed through any of the conventional means for removing chlorine and hydrogen chloride from flue gas stream, such as those described previously.

After having sorbed chloride in the sorption zone 53, spent catalyst particles exit the disengaging-sorption vessel 51 and enter the regeneration vessel 44 by means of catalyst particle inlet conduits 58. The regeneration vessel 44 has an upper section 83 and a lower section 90 and is cylindrical in form. Looking first at the flow of catalyst particles, conduits 58 discharge catalyst particles into an annular catalyst bed 79 formed by an outer catalyst retention screen 76 and an inner catalyst particle retention screen 78. The volume of catalyst particles in the upper section 83 is located in a combustion zone that is generally denoted as 85. Retention screens 76 and 78 are cylindrical in form and concentric with the regeneration vessel 44. Retention screens 76 and 78 are perforated with holes that are large enough to allow gas to pass through the annular catalyst bed 79 but not permit the passage of catalyst particles therethrough. Outer retention screen 76 extends downward from the bottom of conduits 58 to a swedge section 82 of regeneration vessel 44. Supports 80 guide the top of outer retention screen 76 and keep it centered in regeneration vessel 44. Inner retention screen 78 is attached to the top head of regeneration vessel 44 and extends downward therefrom to a point slightly above the lower end of outer retention screen 76. The bottom 91 of the inner retention screen 78 is open to allow oxygen-enriched and chlorine-containing make-up) gas to flow upward from central section 88 to central section 81, as will be described hereinafter. The bottom 86 of the annular catalyst bed 79 is open to allow catalyst particles to empty from the catalyst bed into central section 88 of regeneration vessel 44. From about the bottom of opening 86, the catalyst particles fill the lower section 90 of the regeneration vessel 44. The volume of catalyst particles in the lower section 90 are located in a reconditioning zone that is generally denoted as 89. Catalyst particles in reconditioning zone 89 are statically supported by catalyst particles that extend through the end closure of lower vessel section 90. The catalyst particles are periodically transferred by withdrawing a predetermined volume of catalyst Through conduit 99 which in turn allows all the catalyst particles to slump downward through the previous described zones.

As the catalyst particles travel downward through the regeneration process they pass first through a combustion zone 85 that includes the previously-described annular catalyst bed 79. Looking now at the flows of gas streams in the regeneration system, recycle gas that enters the combustion zone 85 through conduit 74 is distributed in an annular chamber 87 that extends around outer retention screen 76 and is defined on its sides by outer retention screen 76 and the vessel wall of upper vessel section 83 and on its bottom by swedge section 82. An upper portion 77 of inner screen 78 is impervious to gas flow, or blanked off to prevent gas flow from chamber 87 across the top of the regeneration vessel 44. As the recycle gas passes through catalyst bed 79, oxygen is consumed in the combustion of coke and flue gas is collected in central section 81. The process of combusting coke removes chloride from the catalyst particles, and therefore the flue gas contains not only water and carbon dioxide but also chloro-species such as chlorine and hydrogen chloride.

The gas that collects in central section 81 of regeneration vessel 44 includes not only flue gas from catalyst bed 79, but also oxygen-enriched and chlorine-containing make-up gas flowing upward from central section 88. Because the gas that collects in central section 81 includes gas that will be vented as flue gas from the combustion zone 85 as well as gas that will be recycled in the combustion zone 85, the gas is usually denoted "flue gas/recycle gas." The flue gas/recycle gas stream leaves central section 81 and enters a cooler 62 through a conduit 60. The cooler 62 removes some of the heat from the flue gas/recycle gas stream during normal operation. The flue gas/recycle gas stream is conveyed to a blower 68 by a conduit 64. The flue gas/recycle gas stream leaves the blower 68 through a conduit 66. A flue gas stream, which is the portion of the flue gas/recycle gas stream that is rejected from the combustion zone 85, passes through conduit 56 as described previously. The recycle gas stream, which is the portion of the flue gas/recycle gas stream that is recycled in the combustion zone 85, passes through conduit 70 to a heater 72. The heater 72 heats the recycle gas stream to carbon-burning temperatures during start-up and to a lesser degree adds heat to the recycle gas stream during normal operation. The heater 72 operates in conjunction with the cooler 62 to regulate the heat content of the recycle gas stream. The recycle gas stream passes through a conduit 74 and enters the upper section 83 of regeneration vessel 44.

A gas separation system 120 supplies oxygen-enriched make-up gas to the combustion zone 85. This oxygen-enriched make-up gas is introduced, however, initially to a hereinafter-described reconditioning zone 95, which is in the lower section 90 of the regeneration vessel 44 and from which most of the oxygen in the make-up gas ultimately makes its way to the combustion zone 85. Air in a conduit 115 is dried in a drier 117. Air from drier 117 enters gas separation system 120 through a conduit 116. Separation system 120 produces an oxygen-deficient gas stream, carried by a conduit 114 and an oxygen-enriched gas stream carried by a conduit 112. The oxygen-enriched gas stream is added to regeneration vessel 44 at a rate of addition generally equal to the rate of the gas venting from the conduit 56. The oxygen-enriched gas stream from conduit 112 is taken into a blower 110. Blower 110 discharges the oxygen-enriched gas stream into a drier 102 that reduces the moisture content of the oxygen-enriched gas stream. The dry, oxygen-enriched gas stream is passed by a conduit 100 into a heater 98 that raises the temperature of the oxygen-enriched gas stream to about 1000° F. (538° C.). The heated, dry, oxygen-enriched gas stream is taken by a conduit 96 and mixed with a chlorine stream from a conduit 92 that gives the contents of the mixed stream a chlorine concentration of about 0.11 mol-%. The mixed stream of chlorine and heated, dry, oxygen-enriched gas enter the reconditioning zone 89. Although in this arrangement, the dry, oxygen-enriched gas stream discharged from the heater 98 is all transferred by the conduit 96 to the reconditioning zone 89, other regenerator arrangements may split the heated, dry, oxygen-enriched gas stream from conduit 96 between a drying zone and a redispersion zone.

Catalyst below combustion zone 85 is contacted with the mixed stream of chlorine and heated, dry, oxygen-enriched gas that enters the reconditioning zone 89 through conduit 96. Most of the entering gas, including most of the oxygen as well as some of the chlorine and some hydrogen chloride produced from the chlorine, reaches an upper portion of the reconditioning zone 89 and passes into a central portion 88 of the regeneration vessel 44. Central portion 88 is formed by the cylindrical wall of the lower section 90. The gas that passes through the central portion 88 passes upward through the bottom opening 91 of the inner retention screen 78 and enters the central section 81. Although in this arrangement, all of the oxygen-enriched and chlorine-containing gas that reaches the top of the reconditioning zone 89 transfers to the central portion 88, other regenerator arrangements may split the oxygen-enriched gas between the central portion 88 and a gas collection volume that collects a portion of the oxygen-enriched gas and vents it from the regeneration vessel 44.

The catalyst at the bottom of the central portion 88 flows into the reconditioning zone 89 of regeneration vessel 44. Reconditioning zone 89 is formed by a baffle having a vertically extended cylindrical section 95 that is concentrically located with respect to the regeneration vessel 44. Previously-described, heated, dried, chlorine-containing, oxygen-enriched gas enters via conduit 96 into an annular volume 97 that distributes the gas. Distributing volume 97 is defined by the wall of lower vessel section 90 and a baffle consisting of a concentric cylinder 94 that is secured to the lower vessel section 90 by frusto-conical section 84. An open bottom of distributing volume 97 allows gas to be distributed about the entire circumference of the annular distributing volume 97 and about the reconditioning zone 89. Catalyst duration within the reconditioning zone 89 is governed principally by the length of cylindrical section 95. In this example, the reconditioning zone has a sufficient length to provide approximately a four-hour residence time for the particles located therein.

After removal of coke and reconditioning of catalyst particles in the regeneration vessel 44, the catalyst particles are in a partially-regenerated condition, in which the catalyst metal is oxidized and redispersed and in which the catalyst particles are dried. A conduit 99 transfers the partially-regenerated catalyst to a nitrogen seal drum 101 and a lock hopper arrangement 108. A conduit (not shown) may provide a location for introducing additional catalyst into the catalyst transport system via the conduit 99. The seal drum 101 and lock hopper arrangement 108 control the transfer of the partially-regenerated catalyst particles back to the stacked reactor arrangement 24 via the previously-described non-mechanical valve 12 and lift conduit 16. The nitrogen seal drum 101 and lock hopper arrangement 108 also displace oxygen gas from the stream of partially-regenerated catalyst particles to prevent any carry-over of oxygen into the reactor side of the process. Seal drum and lock hopper arrangements are well known to persons skilled in the art and may be used in any of their current, well-known forms to supply a flow of catalyst into lower conduit 10.

EXAMPLES

Unless noted otherwise in the description of the examples that follows, each catalyst chloride result was obtained by analyzing one or more samples of catalyst on an as-received basis. In addition, the molar ratio of water per hydrogen chloride and the hydrogen chloride content of each gas mixture were computed by considering all chloro-species in the gas mixture as hydrogen chloride.

Three reforming catalysts were tested for chloride sorption. Catalysts 1, 2 and 3 had nominal compositions of about 0.38 wt-% platinum (volatile free) and 0.3 wt-% tin (volatile free) on a gamma alumina support. Catalysts 1 and 2 were fresh catalysts and had a nominal loss on ignition at 900° C. (1652° F.) of 0.5–1.5 wt-% and a nominal coke content of less than 0.1 wt-% (as received). Catalyst 1 had a surface area of 186 $m^2$/gram and a chloride content of 0.99 wt-%. Catalyst 2 had a surface area of 210 $m^2$/gram and a nominal chloride content of about 1.15 wt-%. Catalyst 3 was withdrawn from a commercial reforming process with a continuous regeneration section and had a loss on ignition at 900° C. (1652° .F) of 6.1 wt-%, a coke content of about 5 wt-%, a surface area of 113 $m^2$/gram, and a chloride content of 0.97 wt-%.

Example 1

Samples of Catalysts 1 and 3 were contacted with a gas mixture containing nitrogen, water, and hydrogen chloride. The gas mixture was prepared by vaporizing an aqueous hydrogen chloride solution and injecting it into a gas stream containing more than 99.9 mol-% nitrogen so that the gas mixture contained 10 mol-% water, had a molar ratio of water per hydrogen chloride of 12.5, and contained 800 mol-ppm hydrogen chloride. The sorption conditions included a temperature of 302° F. (150° C.), a pressure of 14.7 psi (101 kPa), and a superficial contact time of the gas mixture with the catalyst of 10 seconds. These sorption conditions were maintained for twelve hours. After twelve hours, the chloride content was 2.42 wt-% for the sample of Catalyst 1 and 1.87 wt-% for Catalyst 3.

Example 2

Samples of Catalysts 1 and 2 were contacted at the same sorption conditions as Example 1, except that the gas mixture contained carbon dioxide in addition to nitrogen, water, and hydrogen chloride. The gas mixture was prepared by vaporizing an aqueous hydrogen chloride solution and injecting it into a gas stream containing about 86 mol-% nitrogen and about 14 mol-% carbon dioxide so that the gas mixture contained 10 mol-% water, had a molar ratio of water per hydrogen chloride of 12.5, and contained 800 mol-ppm hydrogen chloride. After twelve hours of contacting, the sample of Catalyst 1 had a chloride content of 2.42 wt-%, which is the same as the chloride content of the sample of Catalyst 1 after contacting with nitrogen in Example 1. After twelve hours of contacting, the sample of Catalyst 2 had a chloride content of 2.57 wt-%.

Example 3

Samples of Catalysts 1 and 2 were contacted at the same sorption conditions as Example 1, except that the gas mixture had a molar ratio of water per hydrogen chloride of 24 instead of 12.5 and contained 417 mol-ppm hydrogen chloride instead of 800 mol-ppm. The gas mixture was prepared by vaporizing an aqueous hydrogen chloride solution, which was less concentrated in hydrogen chloride than the solution used in Example 1, and injecting it into a gas stream containing more than 99.9 mol-% nitrogen so that the gas mixture contained 10 mol-% water, had a molar ratio of water per hydrogen chloride of 24, and contained 417 mol-ppm hydrogen chloride. After twelve hours of contacting, the sample of Catalyst 1 had a chloride content of 2.24 wt-% which is 0.18 wt-% lower than the chloride content of the sample of Catalyst 1 after contacting in Example 1. After twelve hours of contacting, the sample of Catalyst 2 had a chloride content of 2.43 wt-%.

Example 4

Samples of Catalysts 1 and 2 were contacted at the same sorption conditions as Example 1, except that the sorption temperature was 572° F. (300° C.) instead of 302° F. (150° C.). After twelve hours of contacting, the sample of Catalyst 1 had a chloride content of 1.80 wt-%, which is 0.62 wt-% lower than the chloride content of the sample of Catalyst 1 after contacting in Example 1. After twelve hours of contacting, the sample of Catalyst 2 had a chloride content of 1.97 wt-%.

Example 5

A sample of Catalyst 1 was contacted with a pretreating gas containing air, water, and hydrogen chloride. The pretreating gas was prepared by vaporizing a 0.6M aqueous hydrogen chloride solution and injecting it into an air stream. The hydrogen chloride solution was injected at a liquid volumetric rate of 45 cc/hour into the air stream that was flowing at a gas volumetric rate of 3 liter/minute. The pretreatment conditions included a temperature of 977° F. (525° C.) and were maintained for two hours. After two hours, the chloride content of the sample of Catalyst 1 was 0.85 wt-%.

After pretreatment, the sample of Catalyst 1 was contacted at the same sorption conditions as Example 1, except that the gas mixture contained 5 mol-% water, the gas mixture had a molar ratio of water per hydrogen chloride of 300, the gas mixture contained 167 mol-ppm hydrogen chloride, and the sorption temperature was 482° F. (250° C.). After about four days of contacting, the sample of Catalyst 1 had a chloride content of 1.25 wt-%.

What is claimed is:

1. A method for decreasing the environmental release of chloro-species from a process for regenerating spent catalyst particles wherein a recycle stream comprising chloro-species contacts said spent catalyst particles, said method comprising:

(a) withdrawing a recycle stream comprising chloro-species from a regeneration zone containing chlorided catalyst particles comprising chloride;

(b) passing a first portion of said recycle stream comprising chloro-species to said regeneration zone, and at least partially regenerating at least a portion of said chlorided catalyst particles and removing at least a portion of the chloride from said chlorided catalyst particles at regeneration conditions to produce regenerated catalyst particles; and (c) passing a second portion of said recycle stream to a sorption zone containing spent catalyst particles, sorbing at least a portion of the chloro-species in said second portion of said recycle stream on said spent catalyst particles at sorption conditions to produce said chlorided catalyst particles having an increased content of chloride relative to said spent catalyst particles, said sorption conditions comprising the substantial absence of carbon combustion, and withdrawing from said sorption zone a vent stream having a reduced concentration of chloro-species relative to said second portion of said recycle stream.

2. The method of claim 1 further characterized in that a make-up stream comprising chloro-species is combined with said recycle stream to provide a combined stream and said combined stream provides said first and second portions of said recycle stream.

3. The method of claim 2 wherein said recycle stream and said make-up stream comprise the same chloro-species.

4. The method of claim 1 wherein said spent catalyst particles comprise chloride.

5. The method of claim 1 wherein said catalyst particles are moved at least periodically through said sorption zone and said regeneration zone by withdrawing regenerated catalyst particles from said regeneration zone, passing chlorided catalyst particles from said sorption zone to said regeneration zone, and adding spent catalyst particles to said sorption zone.

6. The method of claim 5 wherein spent catalyst particles are added to said regeneration zone.

7. The method of claim 1 wherein a third portion of said recycle stream is rejected from said process.

8. The method of claim 1 wherein a portion of said vent stream provides at least a portion of said recycle stream.

9. The method of claim 1 wherein said chlorided catalyst particles comprise carbon, said recycle stream comprises oxygen, and said regeneration conditions are sufficient to remove at least a portion of the carbon from said chlorided catalyst particles by combustion.

10. The method of claim 1 wherein said chlorided catalyst particles comprise a metal, chloro-species comprises chlorine, and said regeneration conditions are sufficient to disperse at least a portion of said metal.

11. The method of claim 1 further characterized in that said sorption conditions comprise a reduced temperature relative to said regeneration conditions.

12. The method of claim 11 further characterized in that said second portion of said recycle stream is cooled prior to passing to said sorption zone.

13. The method of claim 1 further characterized in that said sorption conditions comprise a reduced pressure relative to said regeneration conditions.

14. The method of claim 1 further characterized in that said second portion of said recycle stream comprises water and at least a portion of the water is removed prior to passing to said sorption zone.

15. The method of claim 1 wherein said catalyst particles comprise alumina.

16. The method of claim 15 wherein said catalyst particles comprise a molecular sieve, silica-alumina, or a clay.

17. The method of claim 1 wherein said sorption zone recovers at least 50 wt-% of the chloro-species from said second portion of said recycle stream.

18. The method of claim 1 further characterized in that a make-up stream having an oxygen concentration of less than 39 mol-% is combined with said recycle stream to provide a combined stream and said combined stream provides at least a portion of said first and second portions of said recycle stream.

19. The method of claim 1 wherein a make-up stream comprising chloro-species is passed to said regeneration zone.

20. A process for the catalytic conversion of a hydrocarbon feedstock in the presence of chloride, said process comprising:

(a) passing a hydrocarbon feedstock to a reaction zone and contacting said feedstock with a catalyst in the presence of chloride, and recovering a hydrocarbon product;

(b) removing deactivated catalyst particles comprising chloride from said reaction zone and adding at least partially regenerated catalyst particles to said reaction zone;

(c) passing said deactivated catalyst particles from said reaction zone to a sorption zone;

(d) withdrawing a recycle stream comprising chloro-species from a regeneration zone;

(e) passing a first portion of said recycle stream comprising chloro-species to said sorption zone, sorbing at least a portion of the chloro-species In said first portion of said recycle stream on said deactivated catalyst particles at sorption conditions to produce said chlorided catalyst particles having an increased content of chloride relative to said deactivated catalyst particles, said sorption conditions comprising the substantial absence of carbon combustion, and withdrawing from said sorption zone a vent stream having a reduced concentration of chloro-species relative to said first portion of said flue stream;

(f) passing said chlorided catalyst particles from said sorption zone to said regeneration zone; and (g) passing a second portion of said recycle stream comprising chloro-species to said regeneration zone, at least partially regenerating said chlorided catalyst particles and removing at least a portion of the chloride from said chlorided catalyst particles at regeneration conditions to produce said at least partially regenerated catalyst particles, and withdrawing from said regeneration zone said at least partially regenerated catalyst particles.

21. The process of claim 20 wherein said reaction zone for hydrocarbon conversion comprises a reforming zone, a dehydrogenation zone, an isomerization zone, an alkylation zone, or a transalkylation zone.

22. A process for reforming a hydrocarbon feedstock, said process comprising:

(a) passing a hydrocarbon feedstock to a catalytic reforming reaction system and contacting said feedstock with regenerated catalyst particles comprising chloride, platinum metal, and an alumina support, reforming said hydrocarbon feedstock and deposing coke on catalyst Particles, and recovering a hydrocarbon product;

(b) at least semicontinuously removing deactivated catalyst particles comprising chloride and having coke deposited thereon from said reforming reaction system and adding at least partially regenerated catalyst particles to said reforming reaction system;

(c) passing said deactivated catalyst particles from said reforming reaction system to a sorption zone;

(d) withdrawing a recycle stream comprising oxygen and at least one of chlorine and hydrogen chloride from a combustion zone of a regeneration zone;

(e) cooling a first portion of said recycle stream comprising oxygen and at least one of chlorine and hydrogen chloride to produce a cooled first portion of said recycle stream, passing said cooled first portion of said recycle stream to said sorption zone, sorbing at least a portion of the chlorine or hydrogen chloride in said cooled first portion of said recycle stream on said deactivated catalyst particles at sorption conditions to produce chlorided catalyst particles having an increased content of chloride relative to said deactivated catalyst particles, said sorption conditions comprising the substantial absence of carbon combustion, and withdrawing from said sorption zone a vent stream having a reduced concentration of chlorine or hydrogen chloride relative to said cooled first portion of said recycle stream;

(f) passing said chlorided catalyst particles from said sorption zone to said combustion zone;

(g) passing a second portion of said recycle stream comprising oxygen and at least one of chlorine and hydrogen chloride to said combustion zone, removing at least a portion of the coke from said chlorided catalyst particles and removing chloride from said chlorided catalyst particles at regeneration conditions that comprise an increased temperature relative to said sorption conditions, producing combusted catalyst particles and a flue stream comprising chlorine or hydrogen chloride, and withdrawing from said combustion zone said combusted catalyst particles;

(h) passing said combusted catalyst particles from said combustion zone to a redispersion zone of said regeneration zone;

(i) passing a redispersion stream comprising oxygen and chlorine to said redispersion zone, redispersing the platinum metal on and removing water from said combusted catalyst particles, and withdrawing from said redispersion zone redispersed catalyst particles and an internal stream comprising oxygen and at least one of chlorine and hydrogen chloride;

(j) passing at least a portion of said internal stream to said combustion zone, combining said portion of said internal stream and said flue stream to form said recycle stream;

(k) passing said redispersed catalyst particles from said redispersion zone to a reduction zone and contacting said redispersed catalyst particles with a hydrogen-rich gas;

(l) recovering said at least partially regenerated catalyst particles from said reduction zone for return to said reaction zone in Step (b).

23. A method for decreasing the environmental release of chloro-species from a process for regenerating spent catalyst particles wherein a recycle stream comprising chloro-species contacts said spent catalyst particles, said method comprising:

(a) withdrawing a recycle stream comprising chloro-species from a regeneration zone containing chlorided catalyst particles comprising chloride;

(b) passing a first portion of said recycle stream comprising chloro-species to said regeneration zone, and at least partially regenerating at least a portion of said chlorided catalyst particles and removing at least a portion of the chloride from said chlorided catalyst particles at regeneration conditions to produce regenerated catalyst particles; and (c) passing a second portion of said recycle stream to a sorption zone containing spent catalyst particles, sorbing at least a portion of the chloro-species in said second portion of said recycle stream on said spent catalyst particles at sorption conditions to produce said chlorided catalyst particles having an increased content of chloride relative to said spent catalyst particles, said sorption conditions comprising a sorption temperature of from 300° F. to 500° F., and withdrawing from said sorption zone a vent stream having a reduced concentration of chloro-species relative to said second portion of said recycle stream.

* * * * *